US011726702B2

(12) United States Patent
Ahmed et al.

(10) Patent No.: US 11,726,702 B2
(45) Date of Patent: Aug. 15, 2023

(54) METHODS AND SYSTEMS FOR PROCESSING READ AND WRITE REQUESTS

(71) Applicant: NETAPP, INC., San Jose, CA (US)

(72) Inventors: Reyaz Ahmed, Fremont, CA (US); Aleksandr Sergeev Khasymski, San Jose, CA (US); Rahul Thekkalore Srinivasa, San Jose, CA (US); Divyeshkumar Shah, San Jose, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/650,583

(22) Filed: Feb. 10, 2022

(65) Prior Publication Data
US 2023/0138290 A1 May 4, 2023

Related U.S. Application Data

(60) Provisional application No. 63/274,649, filed on Nov. 2, 2021.

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
CPC ....... G06F 3/0655; G06F 3/067; G06F 3/0604
See application file for complete search history.

(56) References Cited

U.S. PATENT DOCUMENTS

| 7,539,781 | B1 | 5/2009 | Bali et al. |
| 7,971,236 | B1 | 6/2011 | Lentini |
| 8,122,155 | B1 * | 2/2012 | Marti ............ G06F 13/28 709/212 |

(Continued)

OTHER PUBLICATIONS

Nonell A.R., et al., "Introducing the Task-Aware Storage I/O (TASIO) Library," OpenMP: Conquering the Full Hardware Spectrum: 15th International Workshop on OpenMP, IWOMP 2019, Auckland, New Zealand, Sep. 11-13, 2019, Proceedings 15. Springer International Publishing, 2019.

(Continued)

*Primary Examiner* — Mark A Giardino, Jr.
(74) *Attorney, Agent, or Firm* — Loza & Loza, LLP; Tejinder Singh

(57) ABSTRACT

Methods and systems for processing input/output ("I/O") requests are disclosed. One method includes identifying, a the target, a granular size to split a write request into a plurality of write requests, based on utilization of a processor of the target configured to process input/output (I/O) requests, the granular size indicating a number of the plurality of write requests; generating, by the target, a plurality of read requests to a storage server, each read request corresponding one of the plurality of write requests; issuing, by the target, the plurality of write requests to a storage device controller, in response to receiving data for the plurality of read requests from the storage server; and transmitting, by the target, a completion notification indicating completion of the write request to the storage server, in response to the storage device controller writing data for each of the plurality of write requests.

20 Claims, 14 Drawing Sheets

(56) References Cited

U.S. PATENT DOCUMENTS

| | | |
|---|---|---|
| 8,315,373 B1 | 11/2012 | Flockhart et al. |
| 10,257,273 B2 | 4/2019 | Govind |
| 10,282,250 B1 | 5/2019 | Banerjee et al. |
| 10,592,464 B2 | 3/2020 | Brown et al. |
| 10,613,755 B1 | 4/2020 | Sela et al. |
| 10,635,330 B1* | 4/2020 | Koli ................. G06F 3/067 |
| 2009/0292861 A1 | 11/2009 | Kanevsky et al. |
| 2010/0083247 A1 | 4/2010 | Kanevsky et al. |
| 2014/0259018 A1 | 9/2014 | Jain |
| 2014/0365596 A1 | 12/2014 | Kanevsky et al. |
| 2017/0034268 A1 | 2/2017 | Govind |
| 2017/0034269 A1 | 2/2017 | Nagasubramaniam et al. |
| 2017/0034270 A1* | 2/2017 | Nagasubramaniam ................. G06F 15/167 |
| 2017/0371828 A1* | 12/2017 | Brewer ................. G06F 13/28 |
| 2018/0285021 A1 | 10/2018 | Akaike et al. |
| 2020/0218688 A1* | 7/2020 | Qu ................. G06F 13/28 |

OTHER PUBLICATIONS

Non-Final Office Action dated Mar. 30, 2023 for U.S. Appl. No. 17/650,578, filed Feb. 10, 2022, 13 pages.

Notice of Allowance dated Jun. 26, 2023 for U.S. Appl. No. 17/650,578 filed Feb. 10, 2022, 15 pages.

Ren, Y., et al., "Design and Performance Evaluation of NUMA-Aware RDMA-Based End-to-End Data Transfer Systems," Proceedings of the International Conference on High Performance Computing, Networking, Storage and Analysis, 2013, 10 Pages.

* cited by examiner

METHODS AND SYSTEMS FOR PROCESSING READ AND WRITE REQUESTS

CROSS-REFERENCE TO RELATED APPLICATION

This patent application claims priority under 35 USC § 119(e) to U.S. Provisional Patent Application, entitled "METHODS AND SYSTEMS FOR PROCESSING READ AND WRITE REQUESTS, Ser. No. 63/274,649, filed on Nov. 2, 2021, the disclosure of which is incorporated herein in its entirety.

TECHNICAL FIELD

The present disclosure relates to storage systems, and more particularly, to efficiently processing read and write requests.

BACKGROUND

Various forms of storage systems are used today including direct attached storage (DAS), network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server", "storage server", "storage node", "storage system node" or "storage controller") executing a storage operating system configured to store and retrieve data on behalf of one or more computing systems at one or more storage devices. The storage operating system exports data stored at storage devices as a storage volume (or a logical unit number ("LUN")). Data storage and computing systems today utilize, flash-based storage systems, e.g., NVMe (Non-Volatile Memory Host Controller Interface) solid state drives ("SSDs") that operate based on a NVMe protocol defined by the NVM Express™ (NVMe™) standard organization to retrieve and store information via input/output ("I/O") paths.

To enable independent resource scaling and improve resource utilization, compute and storage resources can be segregated to distinct physical domains in a data center. The physical domains are connected using a network interconnect. This allows the data center to add compute and storage resources independent of each other, based on data center needs. Because of the segregation, the locality of data (e.g., direct attached storage) is disrupted and storage is moved away from compute resources that execute portions of a storage operating system. This increases latency/delay in accessing the disaggregated storage vis-à-vis storage that is locally attached to compute resources. The increased latency has a negative impact on the processing of I/O requests, which can be more pronounced in a disaggregated NVMe over Fabric ("NVMe-oF" or "NVMeoF") based storage fabric because NVMe SSDs are significantly faster than other storage media, which makes latency overhead due to network and software processing more noticeable. Continuous efforts are being made to develop technology that can improve latency in processing I/O requests in a disaggregated storage environment using NVMe SSDs.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
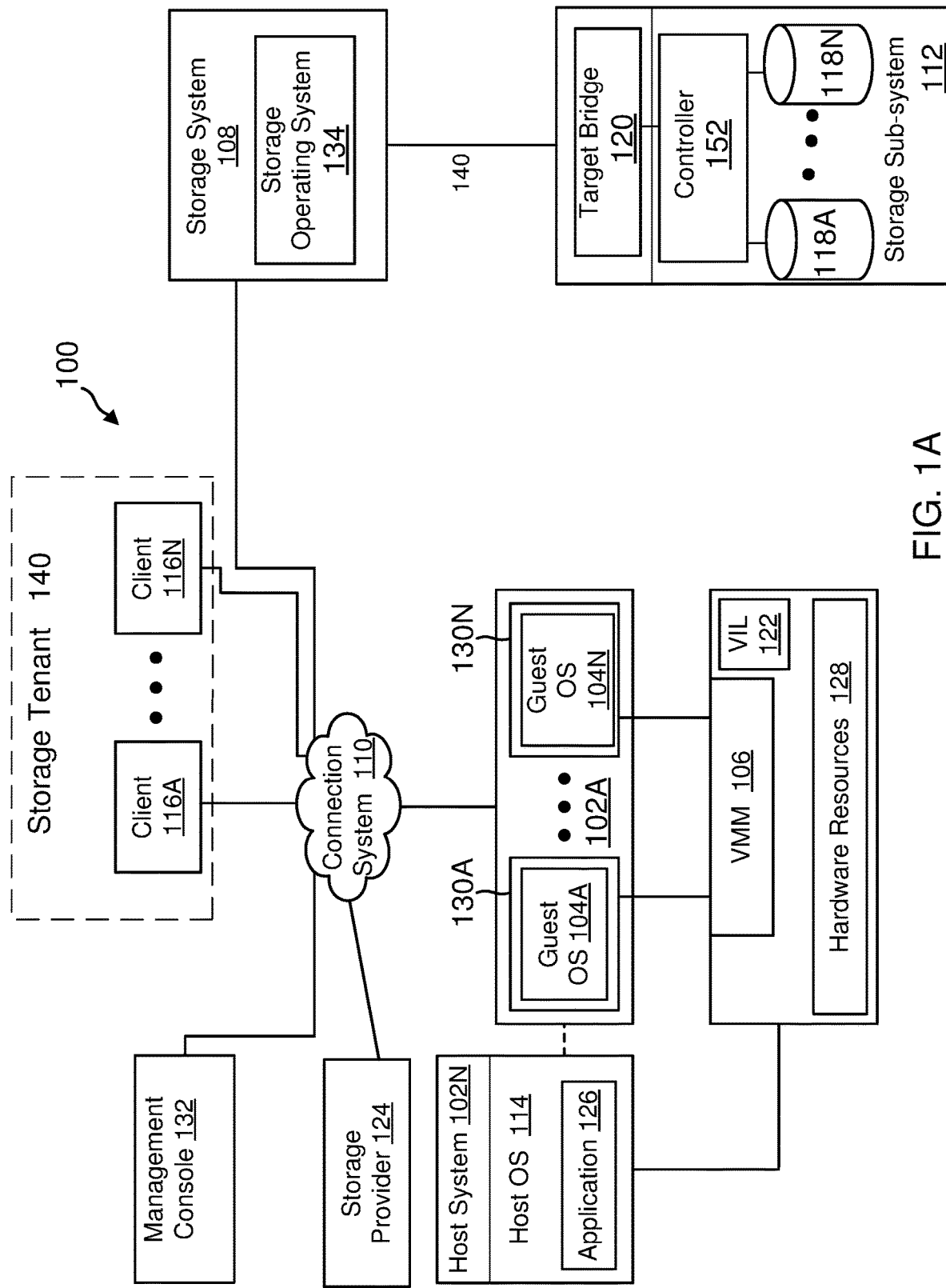
FIG. 1A shows a block diagram of a system, used according to one aspect of the present disclosure.

In one aspect, innovative computing technology is disclosed to reduce latency/delay in processing input/output ("I/O") requests, e.g. large I/O requests (e.g. 64K requests) to read data from and write data to, in a disaggregated storage environment with NVMe solid state drives (SSDs). The technology described herein improves the overall performance of a NVMe over Fabrics (may also be referred to as "NVMe-oF" or "NVMeoF")) based storage system, making it more cost efficient and also reducing latency associated with storing and forwarding data using a network link for data transfer in storage area networks. Because the disclosed technology reduces latency for large size I/O requests, it also enables processor executable applications to access data via the network link with less delay for smaller I/O size requests, as described below in detail.

Before, describing the details of the various aspects of the present disclosure, some background information on NVMe, NVMe-oF and RDMA (Remote Direct Memory Access) technology, also referred to as the "RDMA protocol" may be helpful.

NVMe: NVMe means Non-Volatile Memory Express, a communications interface that defines a command and feature set for PCIe (Peripheral Component Interconnect Express) based SSDs to store and retrieve data. The NVMe protocol communicates with a storage interface and a system CPU (Central Processing Unit) using high-speed PCIe sockets, independent of storage form factors. NVMe SSDs today are used in data center servers and client devices to store data.

NVMe-oF is an extension of the NVMe protocol and provides connectivity between storage devices and servers. NVMe-oF enables consolidation of data center of applications that traditionally rely on direct-attached storage (DAS).

RDMA: RDMA is an extension of Direct Memory Access (DMA) technology, which enables direct access to a computing device/system's (also referred to as a node) memory without CPU intervention. RDMA enables direct access to a memory of a computing device by another computing device via a network connection. To execute RDMA operations, a first node (also referred to as a first RDMA node) operates as an initiator and a second node (may also be referred to as a second RDMA node) may operate as a target. Using a RDMA enabled network interface card (NIC), the first node initiates a network connection with the second node that typically accepts the connection. During the connection negotiations, both nodes set a Maximum Transmission Unit (MTU) size for packet transmission.

Data between the nodes is exchanged using a RDMA send, RDMA read and RDMA write operation via RDMA send, RDMA read, and RDMA write primitives defined by the RDMA protocol. For example, an RDMA send operation transfers data from a memory buffer at the first node to a memory buffer at the second node. The memory buffer at the second node is not advertised by the second node. An RDMA read operation requests transfer (read) of information from a memory buffer at the second node directly to a memory buffer at the first node. An RDMA write operation transfers data from a memory buffer at the first node directly to a memory buffer at the second node. Unlike the RDMA send operation, for the RDMA write operation the memory buffer at the second node is advertised by the second node for an RDMA operation.

RDMA nodes create a protection domain (PD) to associate memory regions with Queue Pairs (QPs). The term QP as used herein includes a structure that maintains a send queue (SQ) and a receive queue (RQ) for managing work requests. A PD is typically represented by a unique identifier. After creating the PD, memory registration is performed by the nodes to enable direct network interface access to pre-defined memory locations. Both nodes register one or more memory locations (may also be called buffers or memory buffers) with each other so that information can be directly placed to or accessed from the registered memory location. Typically, an operating system of each RDMA node registers the memory locations as defined by the RDMA protocol. A registered directly accessible memory location is referred to as a "Memory Region".

During memory registration, a memory key structure is also generated. The memory key structure includes a memory key for authenticating access to a Memory Region. The memory key format/value depends on the type of network protocol, e.g., InfiniBand ("IB"), iWARP (Internet Wide Area RDMA Protocol), RoCE (RDMA over Converged Ethernet), RoCEv2 or any other protocol that is used in conjunction with the RDMA protocol to send and receive data.

IB is typically used to create fabrics with interconnected hosts/switches/servers. The IB Specification is published by the InfiniBand Trade Association ("IBTA) and provides support for RDMA operations.

iWARP is defined by the Internet Engineering Task Force (IETF). iWARP includes a collection of protocols for enabling RDMA based operations over TCP (Transmission Control Protocol) networks. These protocols include MPA (Marker Protocol Data Unit Aligned Framing for TCP), Direct Data Placement (DDP), and the RDMA protocol. The DDP protocol allows data to be placed directly into assigned memory buffers using network protocols, for example, TCP/IP (Internet Protocol) and others.

RoCE is a network protocol that enables use of RDMA over an Ethernet network. This is enabled by encapsulating an IB transport packet over an Ethernet packet. There are two RoCE versions, RoCE v1 and RoCE v2. RoCE v1 is an Ethernet link layer protocol and hence allows communication between any two nodes in the same Ethernet broadcast domain. RoCE v2 is an Internet layer protocol which means that RoCE v2 packets can be routed.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, storage class memory, solid state drive, EEPROM (electrically erasable programmable read only memory), memory stick or any other storage device type, in accordance with the claimed subject matter.

System 100: FIG. 1A shows an example of a networked storage environment 100 (also referred to as system 100), for implementing the various adaptive aspect of the present disclosure. System 100 may include a plurality of computing devices 102A-102N (may also be referred to as a "host system 102," "host systems 102", "computing device 102", "computing devices 102", "node 102", "nodes 102", "server 102" or "servers 102") communicably coupled via a connection system 110 (e.g., a local area network (LAN), wide area network (WAN), the Internet and others) to a storage system 108 (may also be referred to as "storage server 108", "storage controller 108", "storage node 108", "storage nodes 108", "storage system node 108" or "storage system nodes 108") that executes a storage operating system 134 for storing and retrieving data to and from a storage subsystem 112 having mass storage devices 118A-118N via a target bridge 120 (also referred to as a target computing device 120). The storage system 108 in this example operates as a compute node and the target bridge 120 (also referred to as target 120) interfaces with a controller 152 to access storage devices 118A-118N. The target bridge 120 is a computing device or system that is accessible to the storage system 108 via a network link 140. In this context the storage system 108 and the target bridge 120 operate as RDMA nodes to send and receive data via the network link 140. Although only a single storage system 108 is shown in FIG. 1A, according to aspects of the present disclosure, system 100 may include a plurality of storage systems 108 arranged in one or more high-availability pairs. As used herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 126, for example, a database application, an email application, or any other application type that uses the storage system 108 to store information in storage devices 118. Host 102N executes an operating system 114, for example, a Windows based operating system, Linux, Unix and others (without any derogation of any third-party trademark rights) to control the overall operations of host 102N.

Clients 116A-116N are computing devices that can access storage space at the storage sub-system 112 via the connection system 110 and the storage system 108. A client can be the entire system of a company, a department, a project unit or any other entity. Each client is uniquely identified and, optionally, may be a part of a logical structure called a storage tenant 140. The storage tenant 140 represents a set of users (may be referred to as storage consumers) for a storage provider 124 (may also be referred to as a cloud manager, where cloud computing is utilized) that provides access to storage system 108. It is noteworthy that the adaptive aspects of the present disclosure are not limited to using a storage provider or a storage tenant, and instead, may be implemented for direct client access.

In one aspect, the storage operating system 134 has access to storage devices 118A-118N of storage subsystem 112. The mass storage devices 118 include NVMe SSDs, storage class memory, writable storage device media such as hard disk drives (HDD), magnetic disks, video tape, optical, DVD, magnetic tape, and/or any other similar media adapted to store electronic information. The storage devices 118 may be organized as one or more groups of Redundant Array of Independent (or Inexpensive) Disks (RAID). The various aspects disclosed are not limited to any specific storage device type or storage device configuration.

As an example, the storage operating system 134 may provide a set of logical storage volumes (or logical unit numbers (LUNs)) that present storage space to host systems 102, clients 116, and/or VMs (e.g., 130A/130N, described below) for storing information. Each volume may be configured to store data containers (e.g., files, directories, structured or unstructured data, or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

An example of storage operating system 134 is the ONTAP® storage operating system available from NetApp, Inc. that implements a Write Anywhere File Layout (WAFL®) file system (without derogation of any trademark rights of NetApp Inc.) or the CLOUD VOLUMES ONTAP® for executing the storage operating system 134 in the cloud. The various aspects disclosed herein are not limited to any specific file system type and maybe implemented by other file systems and storage operating systems. The storage operating system 134 may have multiple layers and some of those layers may be executed in the target bridge 120.

The storage operating system 134 organizes storage space at the storage subsystem 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 118. A request to store or read data may be based on file-based access protocols, for example, the Common Internet File System (CIFS) protocol or Network File System (NFS) protocol, over TCP/IP. Alternatively, the request may use block-based access protocols, for example, iSCSI (Internet Small Computer Systems Interface) and SCSI encapsulated over Fibre Channel (FCP). The term file/files as used herein include data container/data containers, directory/directories, and/or data object/data objects with structured or unstructured data.

Figure 2A:
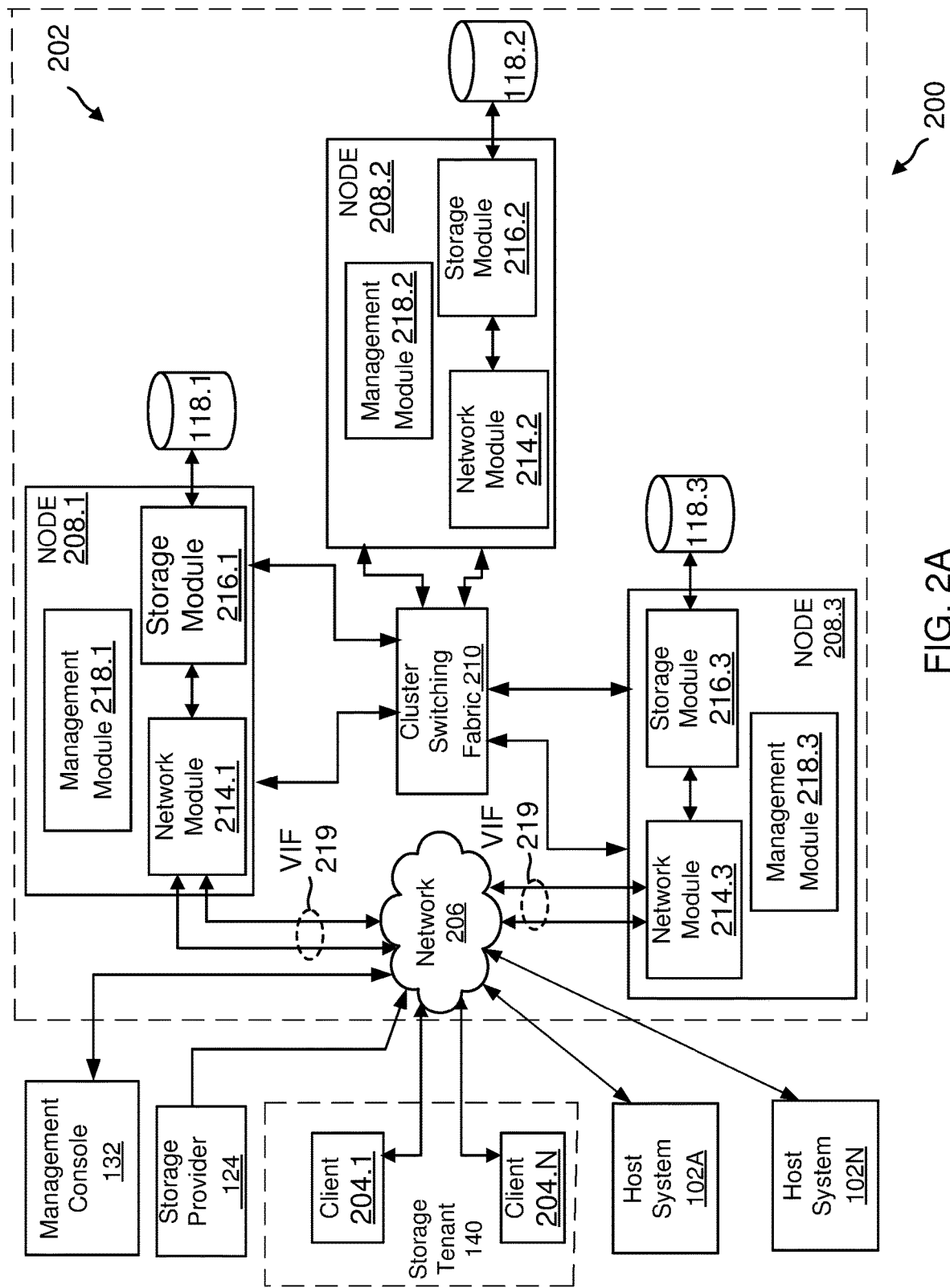
FIG. 2A shows an example of a clustered storage system with a plurality of storage system nodes, used according to various aspects of the present disclosure.
Figure 2B:
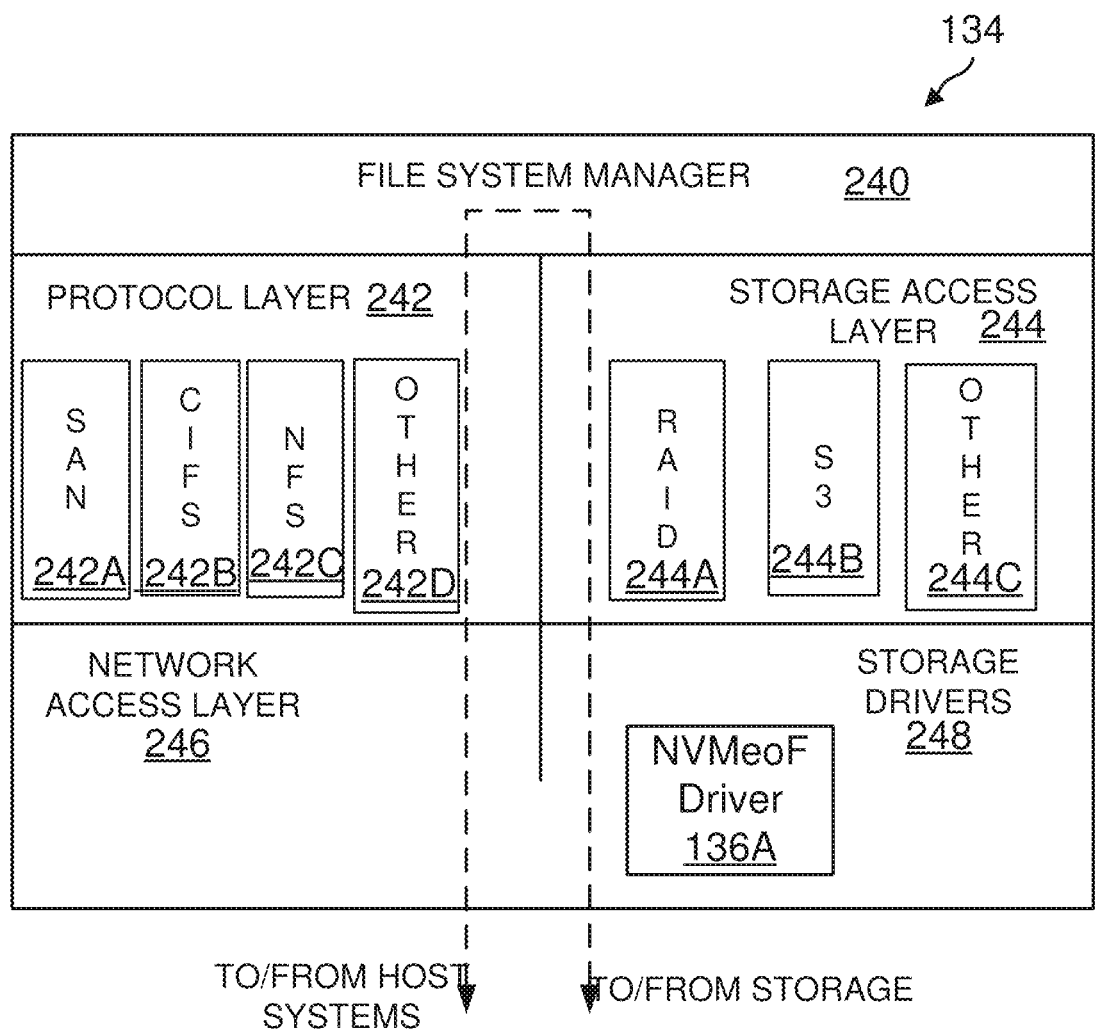
FIG. 2B shows an example of a storage operating system executed by a storage system node, according to various aspects of the present disclosure.

To facilitate access to storage space, the storage operating system 134 implements a file system (also referred to as file system manager e.g., the file system manager 240, shown in FIG. 2B) that logically organizes stored information as a hierarchical structure for files/directories/objects at the storage devices. The storage operating system 134 may further implement a storage module (for example, a RAID system for the storage subsystem 112) that manages the storage and retrieval of the information to and from storage devices 118 in accordance with I/O operations.

In a typical mode of operation, a computing device (e.g., host system 102, client 116 or any other device) transmits one or more I/O requests over connection system 110 to the storage system 108. Storage system 108 receives the I/O requests, issues one or more I/O commands to storage devices 118 via the target bridge 120 to read or write data on behalf of the computing device, and issues a response containing the requested data over the network 110 to the respective client system.

As mentioned above, system 100 may also include a virtual machine environment where a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host system) which may be referred to herein as "host hardware resources". The host hardware resources may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

As shown in FIG. 1A, host system 102A includes/provides a virtual machine environment executing a plurality of VMs 130A-130N (also referred to as VM 130 or VMs 130) that may be presented to client computing devices/systems 116A-116N. VMs 130 execute a plurality of guest OS 104A-104N (may also be referred to as guest OS 104) that share hardware resources 128. Application 126 may also be executed within VMs 130 to access the storage system 108. As described above, hardware resources 128 may include storage, CPU, memory, I/O devices, or any other hardware resource.

In one aspect, host system 102A interfaces with or includes a virtual machine monitor (VMM) 106, for example, a processor executed Hyper-V layer provided by Microsoft Corporation of Redmond, Wash., a hypervisor layer provided by VMWare Inc., or any other type (without derogation of any third-party trademark rights). VMM 106 presents and manages the plurality of guest OS 104A-104N executed by the host system 102A. The VMM 106 may include or interface with a virtualization layer (VIL) 122 that provides one or more virtualized hardware resource to each OS 104A-104N.

In one aspect, VMM 106 is executed by host system 102A with VMs 130. In another aspect, VMM 106 may be executed by an independent stand-alone computing system, referred to as a hypervisor server or VMM server and VMs 130 are presented at one or more computing systems.

It is noteworthy that different vendors provide different virtualization environments, for example, VMware Corporation, Microsoft Corporation, and others. Data centers may have hybrid virtualization environments/technologies, for example, Hyper-V and hypervisor based virtual environments. The generic virtualization environment described above with respect to FIG. 1A may be customized to implement the various aspects of the present disclosure. Furthermore, VMM 106 (or VIL 122) may execute other modules, for example, a storage driver, network interface and others. The virtualization environment may use different hardware and software components and it is desirable for one to know an optimum/compatible configuration.

In one aspect, system 100 uses a management console 132 for configuring and managing the various components of system 100. As an example, the management console 132 may be implemented as or include one or more application programming interfaces (APIs) that are used for managing one or more components of system 100. The APIs may be implemented as REST APIs, where REST means "Representational State Transfer". REST is a scalable system used for building web services. REST systems/interfaces may use HTTP (hyper-text transfer protocol) or other protocols for communicating with one or more devices of system 100.

Although storage system 108 is shown as a stand-alone system, i.e., a non-cluster-based system, in another aspect, storage system 108 may have a distributed architecture; for example, a cluster-based storage system that is described below in detail with respect to FIG. 2A.

As mentioned above, NVMe SSDs (118, FIG. 1A) are becoming preferred storage elements in data centers and NVMe-oF is an emerging technology, which is gaining significant adoption to disaggregate storage elements in data center clusters. While disaggregated storage has multiple advantages over DAS in terms of scalability and management, it introduces additional latency and access time in the storage path to read and write data. The technology disclosed herein solves the latency issue, as described below in detail.

Figure 1B:
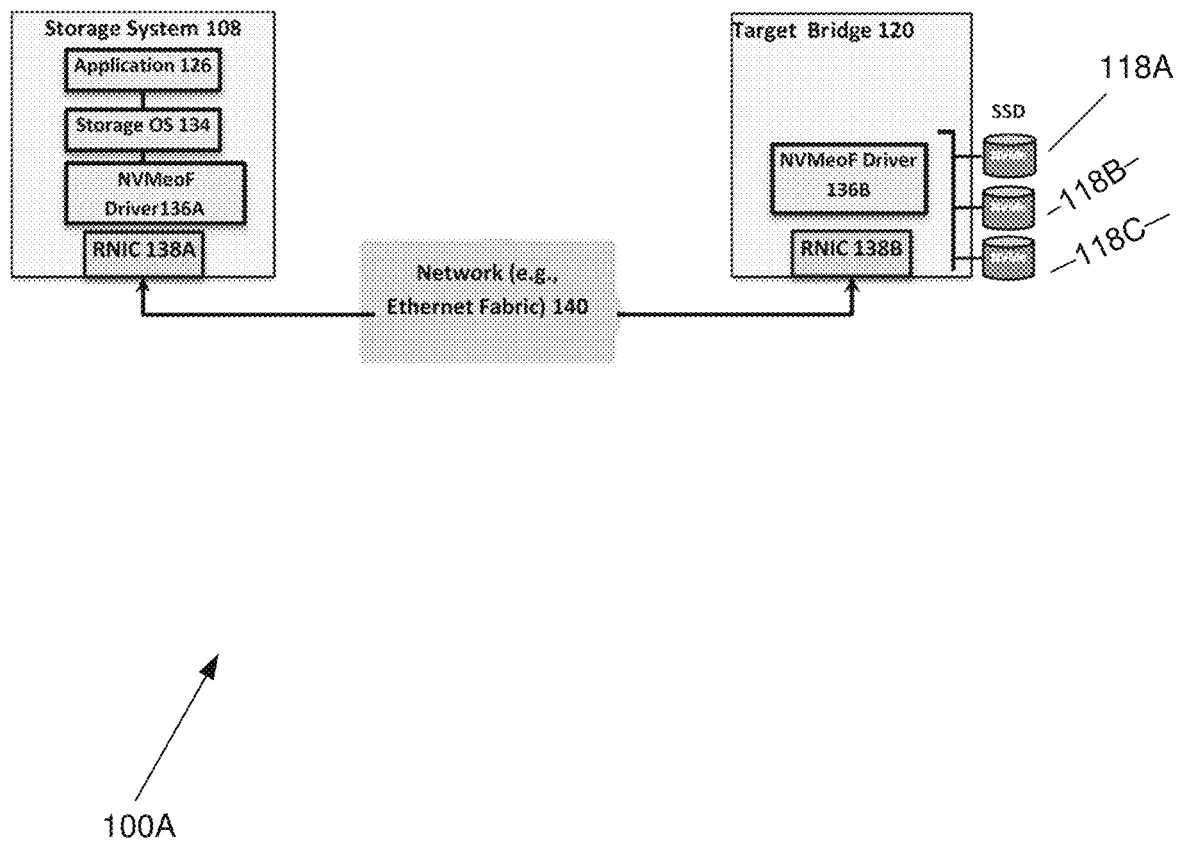
FIG. 1B shows a high-level block diagram of a disaggregated storage environment with separate compute and storage resources.

System 100A: FIG. 1B shows a system 100A that is a subset of system 100 of FIG. 1A. System 100A is an example of a software centric, disaggregated storage architecture where the storage system 108, operating as a compute node/host, accesses NVMe SSDs 118A-118C via the network fabric/link 140 and the target bridge 120. In FIG. 1B, the storage operating system 134 receives a write request to write data or a read request to retrieve data from NVMe SSDs 118A-118C from the application 126. Although for convenience, application 126 is shown within the storage system 108, the application 126 can be executed in host 102, as shown in FIG. 1A. The storage operating system 134 includes a NVMe-oF driver 136A (also referred to as an initiator driver 136A when the storage system 108 initiates communication with the target bridge 120) that operates in conjunction with a RDMA NIC (RDMA network interface card) ("RNIC") 138A to communicate with the target bridge 120. The target bridge 120 also executes a NVMe-oF driver 136B (may also be referred to as target driver 136B) and RNIC 138B to receive and send data via the network link 140 (may also be referred to as network fabric, e.g., an Ethernet Fabric). The received data is stored at the NVMe SSDs 118A-118C by the storage subsystem, shown as a NVMe subsystem 112 having a controller 152 in FIG. 1C.

In FIG. 1B, data at the NVMe SSDs 118A-118C is accessed through a system of software bridging from an external network fabric protocol to internal PCIe transport protocols. The software bridging system usually implements a store and forward method to move data between the external network fabric (e.g., 140) and internal PCIe buses, which, as explained above, introduces delay in the I/O path, increasing latency in writing and reading data. The additional increase in latency due to storing and forwarding of data packets diminishes the overall performance advantage of NVMe SSDs, and hence is undesirable.

Figure 1C:
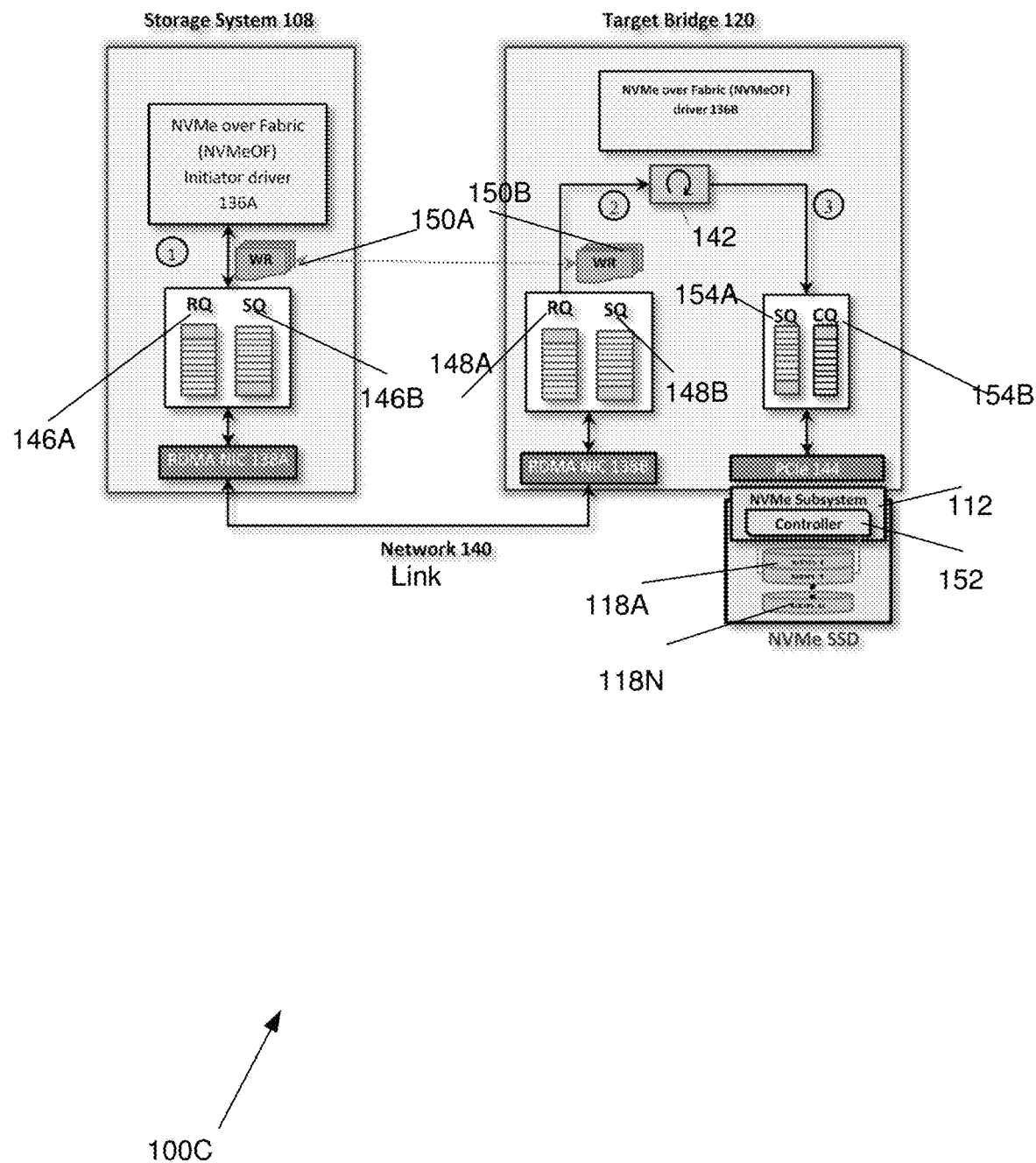
FIG. 1C shows an example of a conventional disaggregated storage environment.

FIG. 1C shows an example of a conventional store and forward architecture 100C that the present technology improves, according to one aspect of the present disclosure. In system 100C, to transmit and receive data, the storage system 108 and the target bridge 120, operating as RDMA nodes, maintain a set of receive queues ("RQ") 146A/148A and send queues ("SQ") 146B/148B. RQs 146A/146B is used to stage received data, while SQs 148A/148B temporarily stores data before data is sent. Data is sent or received by sending and receiving work requests (WRs), shown as 150A/150B. The target bridge 120 includes a PCIe interface 144 that interfaces with the NVMe subsystem 112. The PCIe interface 144 maintains SQ 154A and a set of completion queues ("CQ") 154B to manage read and writes directed to the NVMe SSDs 118A-118N. The NVMe subsystem 112 uses controller 152 to interface with the NVMe SSDs 118A-118N for reading and writing data.

Architecture 100C enables I/O processing but incurs a penalty due to storing and forwarding data in the I/O path. In FIG. 1C, data moves in three stages. In stage 1, the initiator driver 136A provides an I/O request to move data between the storage system 108 and the NVMe SSDs 118. The request indicates if it is read or write request and provides a storage location (e.g. a logical block address (LBA)) to read data from or write data to. In stage 2, based on the request type, the target bridge 120 brings the data to its memory 142. In other words, the target bridge 120 stores the data temporarily to its memory buffers (142). In stage 3, the target bridge 120 forwards the data to its destination NVMe SSD using hardware/DMA assist operations. Irrespective of the direction of data movement, the target bridge 120 has to store data in memory 142 before it can be forwarded to its destination. This causes latency, especially if the I/O request involves a larger amount of data.

Furthermore, to discern the state of RQ 148A and SQ 148B, a processor (or a CPU) of the target bridge 120 polls the queues at a fixed polling rate. This can result in numerous wasted CPU cycles especially when the queues are empty. This inefficient use of CPU cycles also increases power consumption. The technology disclosed herein structures CPU polling workload so that a reduced number of CPU cores can be used to poll the various queues without impacting overall latency.

In one aspect, the present disclosure addresses the limitations of the conventional technology of FIG. 1C for transferring large I/Os across a network fabric using a system 100D of FIG. 1D, where a processor executable, software entity, shown as bridge layer 156, conditionally breaks larger I/O requests into smaller chunks to utilize NVMe SSD based parallelism, as described below. Additionally, the bridge layer 156 dynamically "right-sizes" granularity at which work requests (WR 150B) posted in relevant send/receive/completion queues are acted on, adapting the queue size to ensure that the polling granularity is sufficient and overall latency is reduced. The granularity can be coarse enough to avoid a CPU bottleneck, where a number of available CPU cores are unable to poll fast enough to achieve a desired (e.g., maximum) bandwidth available throughout the other parts of the system (e.g. interconnect 140, backend interconnect to storage devices, and memory), and capabilities of the storage devices themselves.

In one aspect, the store and forward data transfer (i.e., RDMA read/write) via the network fabric 140 as well as on the PCIe interface 144 is split into smaller transactions to overlay the data flow from the target bridge memory 142, which may be a DDR (double data rate) memory. The operational efficiency of NVMe SSDs is fully engaged by the bridge layer 156 by reducing data movement and utilizing multi queue parallelism of the PCIe NVMe interface 144. Splitting a large I/O request into smaller size I/Os removes the necessity to store the entire data for an I/O request in memory 142, before the data is forwarded to its destination.

Figure 1D:
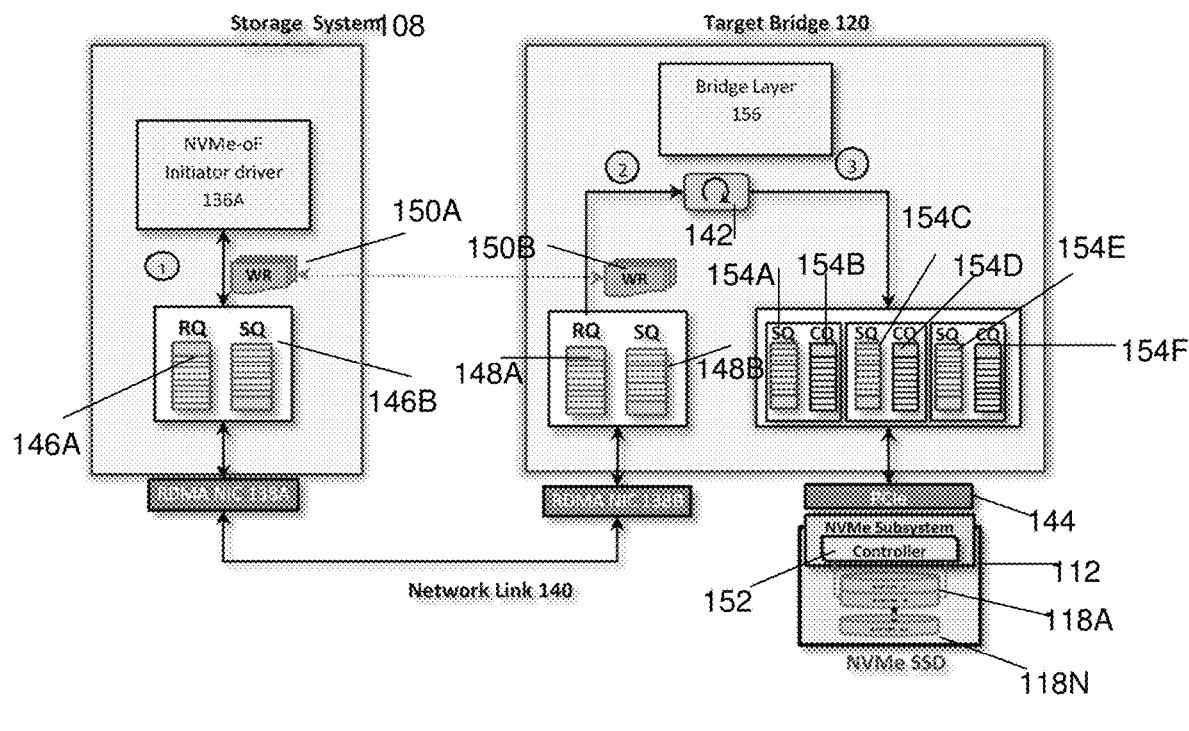
FIG. 1D shows an example of a system for processing Input/Output ("I/O") requests in a disaggregated storage environment, according to one aspect of the present disclosure.

In one aspect of the present disclosure, data flow of FIG. 1D occurs in stages 1-3. In stage 1, the initiator driver 136A provides an I/O request to move data between the storage system 108 and the NVMe SSD(s) 118A-118N. At stages 2 and 3, based on the request type (i.e., read or write request), the target bridge 120 brings part of the data temporarily in its own memory 142. The target bridge 120 then forwards the data to its destination NVMe SSD. In this example, the bridge layer 156 may utilize a multi-queue interface (e.g. 154A-154F) maintained by the PCIe NVMe layer 144 to utilize I/O processing parallelism while transferring data to and from the NVMe SSDs 118A-118N.

When a read request with a large payload is received, the bridge layer 156 creates smaller read commands on the PCIe interface 144. For each smaller read command completed by the NVMe SSD, a RDMA write transaction is triggered to the storage system 108 via network link 140. A write request to the NVMe SSD is handled in a similar manner by the bridge layer 156 by executing smaller write commands to the PCIe interface 144 as RDMA read transactions are being completed.

Depending on the size of the I/Os, there may be multiple WRs per split I/O (FIG. 1D). In a poll-mode version of the bridge layer 156, the finest granularity is to poll for the status of every single WR as it passes through the target bridge 120. Granularity can be adjusted by acting on every Nth WR, such that there is only one WR per split I/O.

In the poll-mode version of the bridge layer 156, dynamic granularity optimization is achieved by monitoring various metrics in the target bridge 120, e.g., target bridge CPU (e.g., 502, FIG. 4) bottleneck detected by monitoring the number of entries polled at each polling event. The CPU processes a maximum number of WRs per poll cycle, which can be tuned to match the NVMe SSD performance. If there are consistently more than the maximum number of WRs at each poll of the queues, then that means the CPU is not polling fast enough, and/or granularity at which WRs are acted on is too fine and needs to be made coarser. The bridge layer 156 can adapt the granularity of the WR polling based on the workloads, e.g., based on a number of large I/Os. In one aspect, a low number of large I/Os sent to a limited number of NVMe SSDs have the finest possible granularity of operation where every single WR is acted on. As the number of storage devices increase, or the I/O size increases, or the number of large I/Os to each device increases, polling granularity is adjusted dynamically to ensure there is enough CPU processing capability to process the WRs.

Figure 1E:
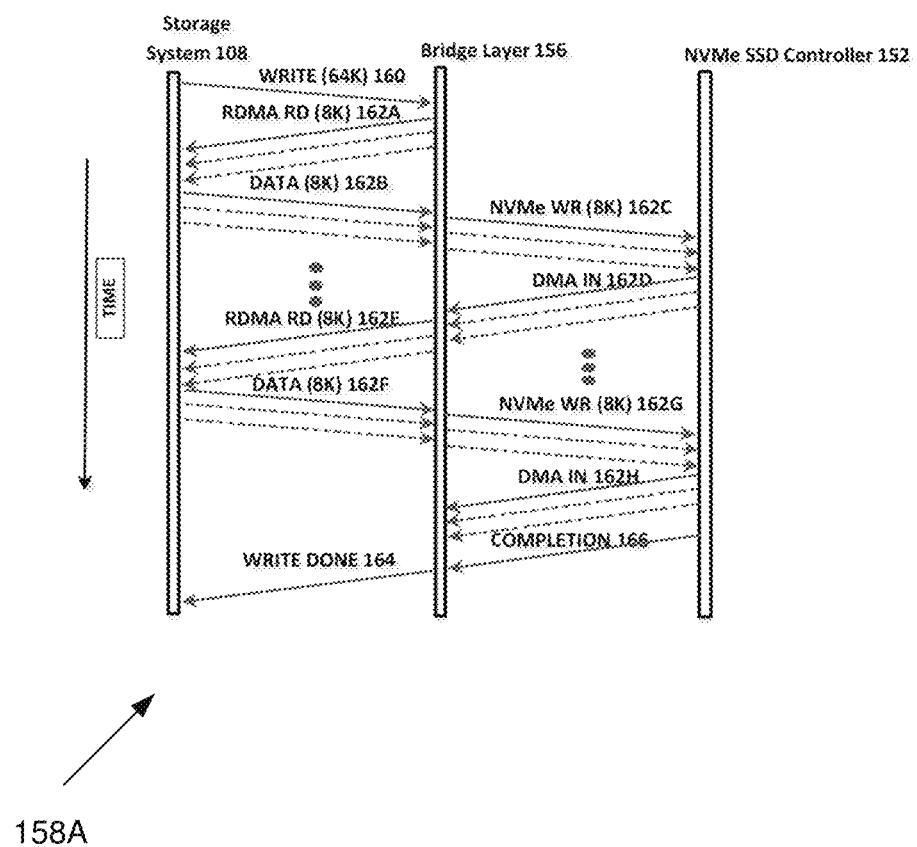
FIG. 1E shows an example of processing write request in a disaggregated storage environment, according to one aspect of the present disclosure.

FIG. 1E shows an example of processing write requests in a write path 158A between the storage system 108, the bridge layer 156 and the NVMe SSD controller 152, according to one aspect of the present disclosure. In FIG. 1E, a write request 160 is received from the storage system 108 by the bridge layer 156 of the target bridge 120. The write request 160 may be determined to be a large I/O request based on the amount of data that has to be written, in this example, 64k. What may be considered a large I/O may vary based on the computing and networking capabilities of the storage system 108, the target bridge 120 and the NVMe SSDs 118. The bridge layer 156 splits the write request 160 into a plurality of smaller sized, equal weight sub-commands, e.g., 8k requests, shown as 162C and 162G. The number of plurality of write requests may depend on a utilization (e.g., 153B, FIG. 1K) of one or more processors of the target bridge 120 to process I/O requests and a hit rate (e.g., 151B, FIG. 1K) for polling receive queues 148 at a certain polling rate (e.g., 151C, FIG. 1K). The processor utilization is continuously monitored and maintained at a data structure 153, shown in FIG. 1K and described below in detail. The hit rate 151B is maintained in data structure 151, also shown in FIG. 1K.

The bridge layer 156 also initiates a plurality of RDMA read requests for the storage system, e.g., 8k, RDMA read requests 162A and 162E. The storage system 108 transfers 8k data for each request to the bridge layer 156, shown as 162B and 162F, using the RDMA protocol and the network link 140. Once data 162B/162F is received from the storage system 108 and stored at the bridge memory 142, NVMe write requests 162C and 162G initiated by the bridge layer 156 for the NVMe SSD controller 152 are executed. The NVMe SSD controller 152 transfers 8K chunk of data from the target bridge memory 142 to the NVMe SSDs 118A-118N using DMA operations 162D/162H, respectively. Once all the data is written, a completion 166 is received by the bridge layer 156 from the NVMe SSD controller 152 and a write completion 164 is provided to the storage system 108 indicating that the write request 160 has now been completed.

In one aspect of the present disclosure, the read requests 162A/162E can be aligned with the NVMe writes 162C/162G to the NVMe controller 152, which improves processing of the write request 160 because as soon as data 162B/162F is received by the bridge layer 156, the NVMe SSD controller 152 can DMA the received data to the NVMe SSDs 118. Because smaller data chunks are sent and received between the storage system 108 and the bridge layer 156, it uses less network bandwidth as well the bandwidth of the DMA channels for the DMA operations. This reduces latency for processing I/O requests that are smaller in size than the large I/O request 160 because network and computing resources are not overused for the large I/O.

Figure 1F:
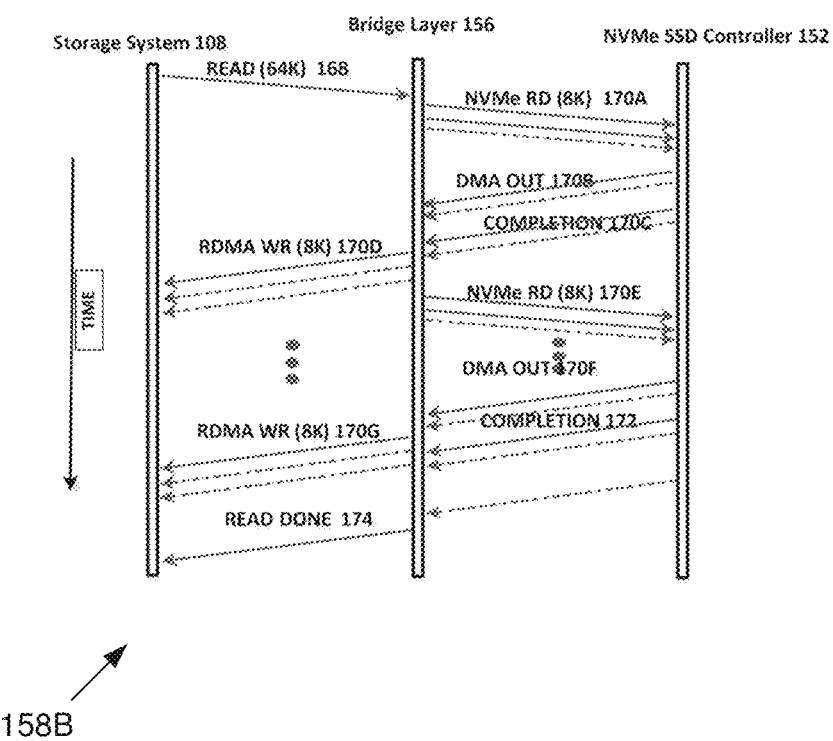
FIG. 1F shows an example of processing read requests in a disaggregated storage environment, according to one aspect of the present disclosure.

FIG. 1F shows an example of a read path 158B between the storage system 108, the bridge layer 156 and the NVMe SSD controller 152, according to one aspect of the present disclosure. In the read path 158B, a read request 168 is received by the bridge layer 156 from the storage system 108. The read request 168 may be determined to be a large I/O request based on the amount of data that has to be read, in this example, 64k. What may be considered a large I/O may vary based on the computing and networking capabilities of the storage system 108, the target bridge 120 and the NVMe SSDs 118.

In response to the read request 168, the bridge layer 156 splits/segments the read request 168 into multiple smaller sized equal weight read requests (e.g. 8k requests, shown as 170A/170E) for the NVMe SSD controller 152. The number of plurality of read requests may depend on the utilization (e.g., 153B, FIG. 1K) of one or more processors of the target bridge 120 to process I/O requests and the hit rate (e.g., 151B, FIG. 1K) for polling receive queues 148 at a certain polling rate (e.g., 151C, FIG. 1K). The processor utilization is continuously monitored and maintained at the data structure 153, shown in FIG. 1K and described below in detail. The hit rate 151B is maintained in the data structure 151, also shown in FIG. 1K.

The bridge layer 156 posts these smaller sized read requests to an NVMe queue (not shown) and can optionally scatter multiple reads in multiple NVMe queues depending upon the number of split read requests. The NVMe controller 152 uses DMA operations 170B/170F to transfer the requested data from the NVMs SSDs 118 the target bridge memory 142, in response to the read requests 170A and 170E, respectively.

When the NVMe controller 152 completes each read request, a corresponding RDMA write request (e.g., 170D, 170G) is initiated by the bridge layer 156 for the storage system 108. Data for RDMA write requests 170D and 170G is transferred to a memory of the storage system 108 via the network link 140. The NVMe read operations and the RDMA write operations overlap so that completion (shown as 170C and 172) of the read requests 170B and 170E can be aligned with the corresponding RDMA write operations 170D and 170G. This improves overall processing of the read request 168 because as soon as data is received by the bridge layer 156 it is transferred in smaller chunks to the storage system 108. Because smaller data chunks are sent and received between the storage system 108 and the bridge layer 156, it uses less network bandwidth as well the bandwidth of the DMA channels for the DMA operations. This reduces latency for processing I/O requests that are smaller in size than the large I/O request 160 because network and computing resources are not overused for the large I/O.

Figure 1G:
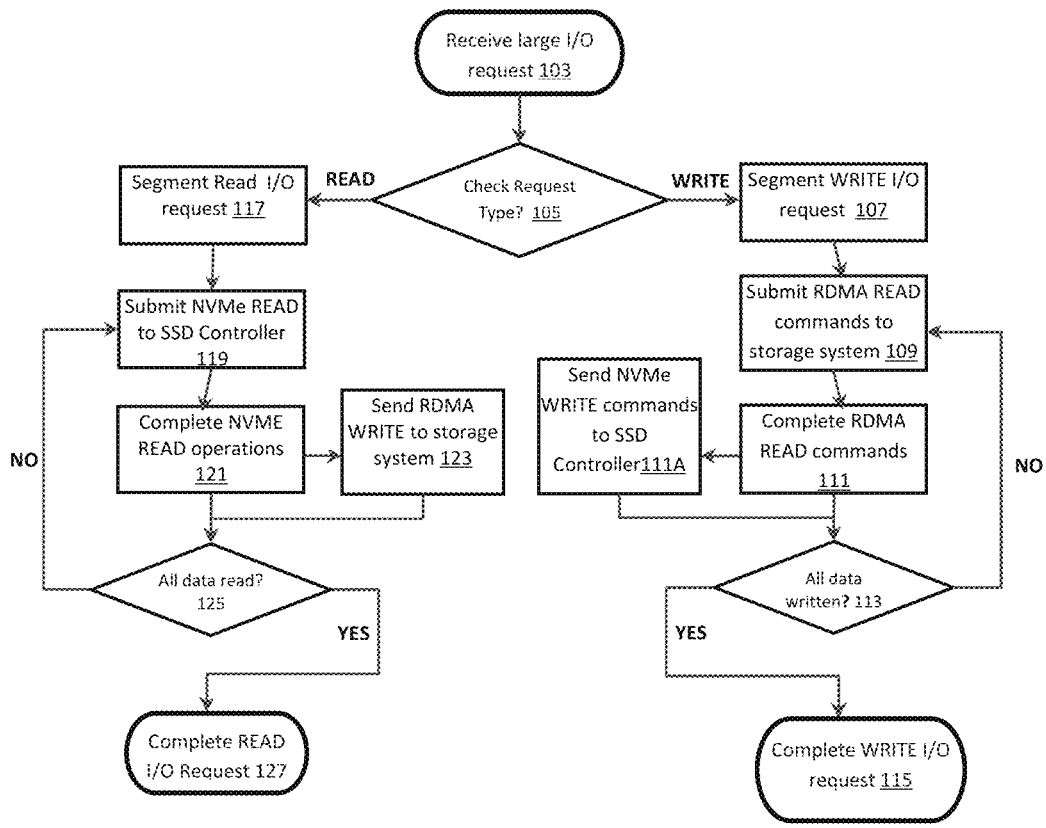
FIG. 1G shows an overall process for handling read and write requests in a disaggregated storage environment, according to one aspect of the present disclosure.

FIG. 1G shows a process 101 for processing read and write requests, according to one aspect of the present disclosure. Process 101 operations are executed by the bridge layer 156 based on run-time heuristics indicating availabilits of system load and computing resources. Process 101 begins in block 103 when a large I/O request is received by the target bridge 120. The large 110 request may be received from the storage system 108. An I/O request is deemed a "large 110 request" based on a pre-defined size. The pre-defined size is based on the target bridge 120 capabilities and the overall operating environment. In block 105, the request type is deteimined i.e., whether the request is a read request to read data or a write request to write data to the NVMe SSDs 118.

In block 107, when the request is a write request (e.g. 160, FIG. 1E) the write request is segmented into multiple requests, e.g., 162C/162G, as shown in FIG. 1E and described above. In block 109, the target bridge 120 submits multiple RDMA read requests to the storage system 108, e.g., 162A/162E, also shown in FIG. 1E. In block 111, when the data in response to the RDMA read requests of block 107 is received, the data is sent to the NVMe SSDs 118 in block 111A using multiple write requests 162C/162G via DMA operations 162D/162H, respectively. The process reverts to block 109, if all data is written, as determined in block 113. If all the data is written, a completion status 166 is sent to the bridge layer 156 by the NVMe SSD controller 152. The bridge layer 156 then sends a completion 164 to the storage system 108 in block 115.

For a read request in the read path 158B of FIG. 1F, the read request 168 is segmented or split into multiple requests by the bridge layer 156 in block 117 and read requests 170A/170E are submitted via the PCIe interface 144 to the NVMe controller 152 to read the requested data from the NVMe SSDs 118. Data is read by the NVMe SSD controller 152 and transferred to the target memory 142 via DMA operations 170B/170F in block 121, and RDMA write requests 170D/170G are sent to the storage system 108 in block 123. When all the requested data has not been read, as determined in block 125, the process reverts to block 119, otherwise, the read request is completed in block 127. A completion 174 is sent by the bridge layer 156 to the storage system 108. In one aspect, the completion is sent when the NVMe SSD controller 152 sends completion 170C/172 for completing 170A/170E.

Figure 1H:
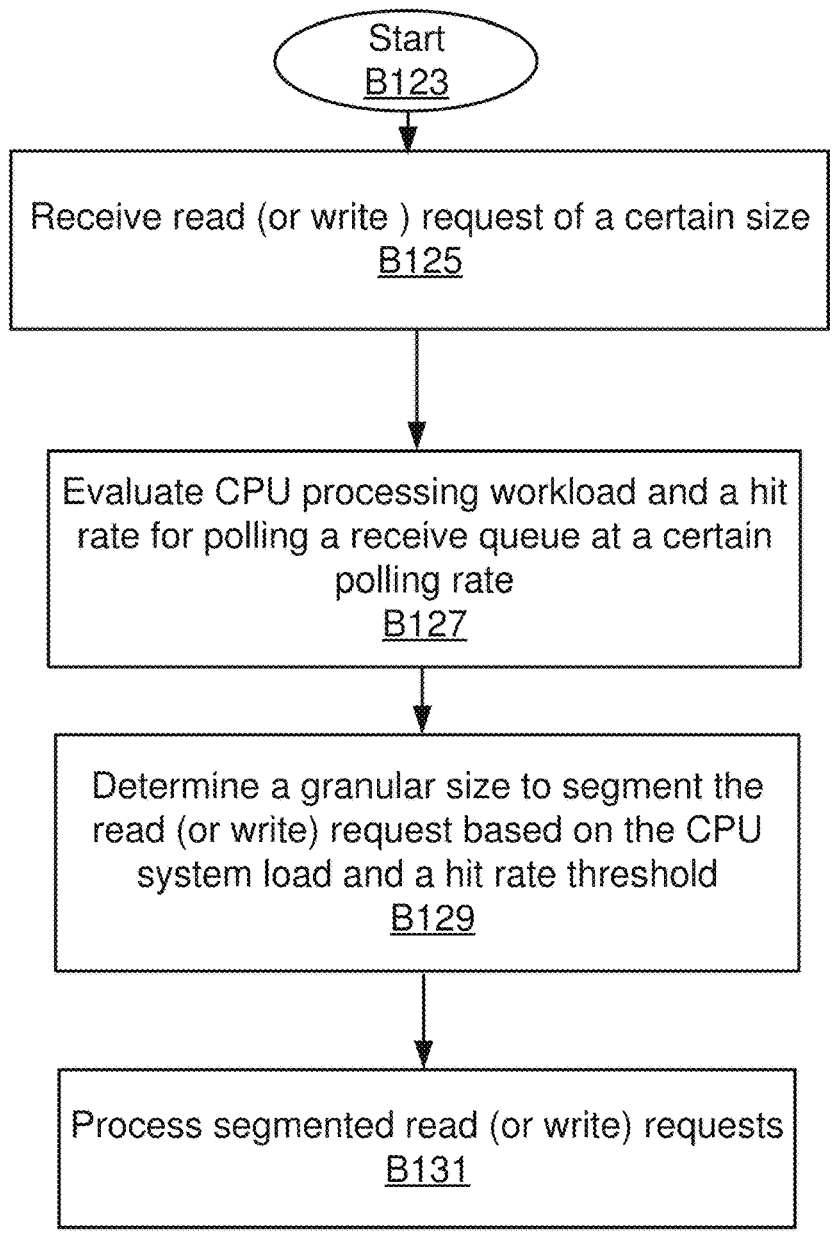
FIG. 1H shows a process flow for adjusting a granular size of splitting read (or write) requests in a disaggregated storage environment, according to one aspect of the present disclosure.

FIG. 1H shows a process 121 for determining a granular size for segmenting/splitting read requests, as shown in FIG. 1F (or write requests of FIG. 1E), according to one aspect of the present disclosure. The process begins in block B123, when the storage system 108 and the target bridge 120 are initialized and operational. In block B125, a read (or write) request of a certain size is received.

In block B127, the bridge layer 156 evaluates a current target bridge 120 CPU processing workload and a hit rate for polling a receive queue (e.g., 148A) at a certain polling rate. In one aspect, the bridge layer 156 has access to the data structure 151 and 153 (see FIG. 1K). Data structure 151 stores a RQ identifier 151A, the hit rate 151B with the corresponding polling rate 151C and a polling rate threshold 151D. The hit rate 151B indicates the number of "hits" i.e., a number of I/O requests that may be pending when the queue is polled at the polling rate 151C. The threshold 151D indicates whether the polling rate should be increased or decreased, as described below with respect to FIG. 1I. Data structure 153 includes a processor identifier 153A that identifies each processor, the processor utilization 153B and the size 153C which indicates the granular size to segment I/O requests. The processor utilization 153B indicates the overall workload of the target bridge 120 CPU.

In block B129, a granular size to split/segment the read (or write) request is determined based on the determination in block B127. The granular size indicates a number of read (or write) requests into which the read (or write) request of block B125 is segmented/split. In one aspect, when CPU utilization is below a threshold value (i.e., the CPU is not fully utilized) and the hit rate is low (i.e. a lower number of pending I/O requests) then the granular size for segmenting the read (or write) requests is high. The granular size is reduced when the CPU utilization and the hit rate are higher (i.e., CPU is already busy and there are a higher number of pending I/O requests). The read (or write) request is segmented dynamically and processed in block B131 as described above with respect to FIGS. 1F and 1G.

Figure 1I:
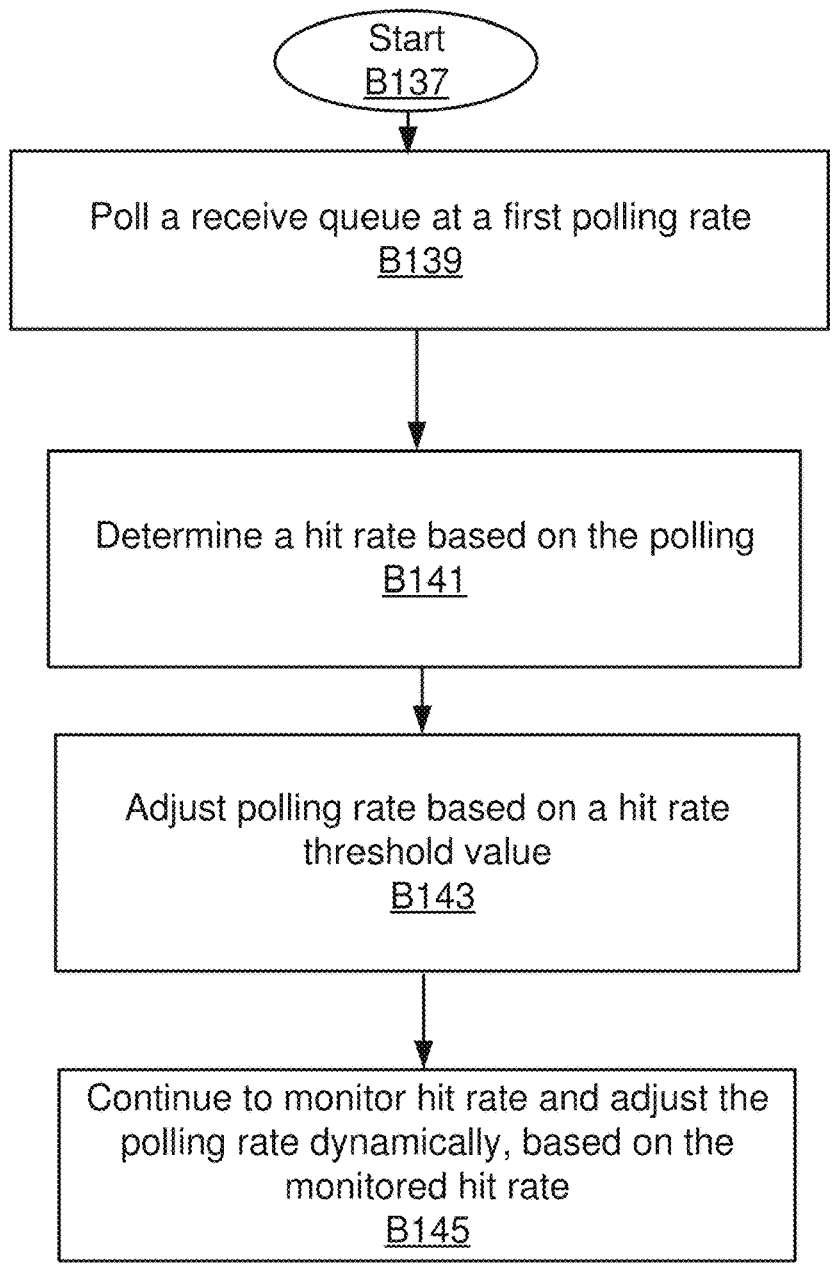
FIG. 1I shows a process flow for adjusting a polling rate to poll receive queues used in a disaggregated storage environment, according to one aspect of the present disclosure.

FIG. 1I shows another process 135 for polling receive queues at the target bridge 120, according to one aspect of the present disclosure. The process 135 begins in block B137, when the target bridge 120 and the storage system 108 are operational. In block B139, the bridge layer 156 polls the RQ 148A at a certain polling rate i.e., the queues are polled at a certain rate within a certain duration. The bridge layer 156 tracks the hit rate 151B in data structure 151 (FIG. 1K) during the polling. The hit rate in this context indicates that the RQ 148A has information that needs to be processed by the bridge layer 156. If the hit rate has reached the threshold value 151D, then the polling rate 151C is adjusted up or down in block B143. The threshold value 151D to increase the polling frequency is adjusted when the polling results in a high hit rate for a certain duration. If the hit rate is very low, then the polling frequency is reduced. The polling rate is continuously monitored by the bridge layer 156 in block B145 so that it can be dynamically adjusted.

In one aspect, the technology disclosed herein splits/segments I/O requests directed to NVMe SSDs into multiple individual requests to take advantage of multiple queues for the NVMe SSDs. The split requests for each queue can be further split. This request splitting improves an I/O operation but may adversely impact monitoring requests. For example, a target bridge 120 CPU can check status of, e.g., 32 requests per polling event. The I/O request splitting increases the number of requests to track, so the allocated CPU runs at a full polling rate and additional CPUs may be needed to monitor all the requests. This takes CPU time away from other tasks in the target bridge 120, limiting performance in other areas, and/or increased power consumption, with cooling ramifications.

In one aspect, the technology disclosed herein uses selective signaling to limit CPU usage when polling queues. In selective signaling (as described above with respect to FIG. 1I), not all RDMA requests are monitored, e.g., only 1 in N requests are monitored. Two variables can be adjusted, N, the number of polling requests and the polling rate. Both values can be dynamically changed. If a mix of I/Os leans toward smaller I/Os, the polling rate is first increased. At any given rate, if the number of requests monitored reaches a certain number, the polling rate is increased.

When a maximum polling rate is reached, then the value of N is increased to a maximum value. For an I/O mix that is primarily large I/Os, the value of N is changed first and then the polling rate is increased, when the maximum N value is reached. The value of N can vary from 1 to the number of requests in a request split for a given queue. For example, if a 16k write request is received, then the request can be split into 4 child, 4k requests. In this case, 4 is the maximum value of N. Any larger value and the last request of the queue-level split is not monitored. When N is set to 4, only a last request is monitored, as completion of that request is used to signal completion to a requesting entity. The completion of the requests before the last request in the queue split need not be monitored, but can be, as the actual processing of the requests in the queue is handled in hardware and any failure would be reflected based on the hardware failure. In this example, if N is set to 3, then the last request is monitored. The use of selective signaling enables reducing the number of CPUs for queue monitoring and reduced power consumption for used CPU cores.

Figure 1J:
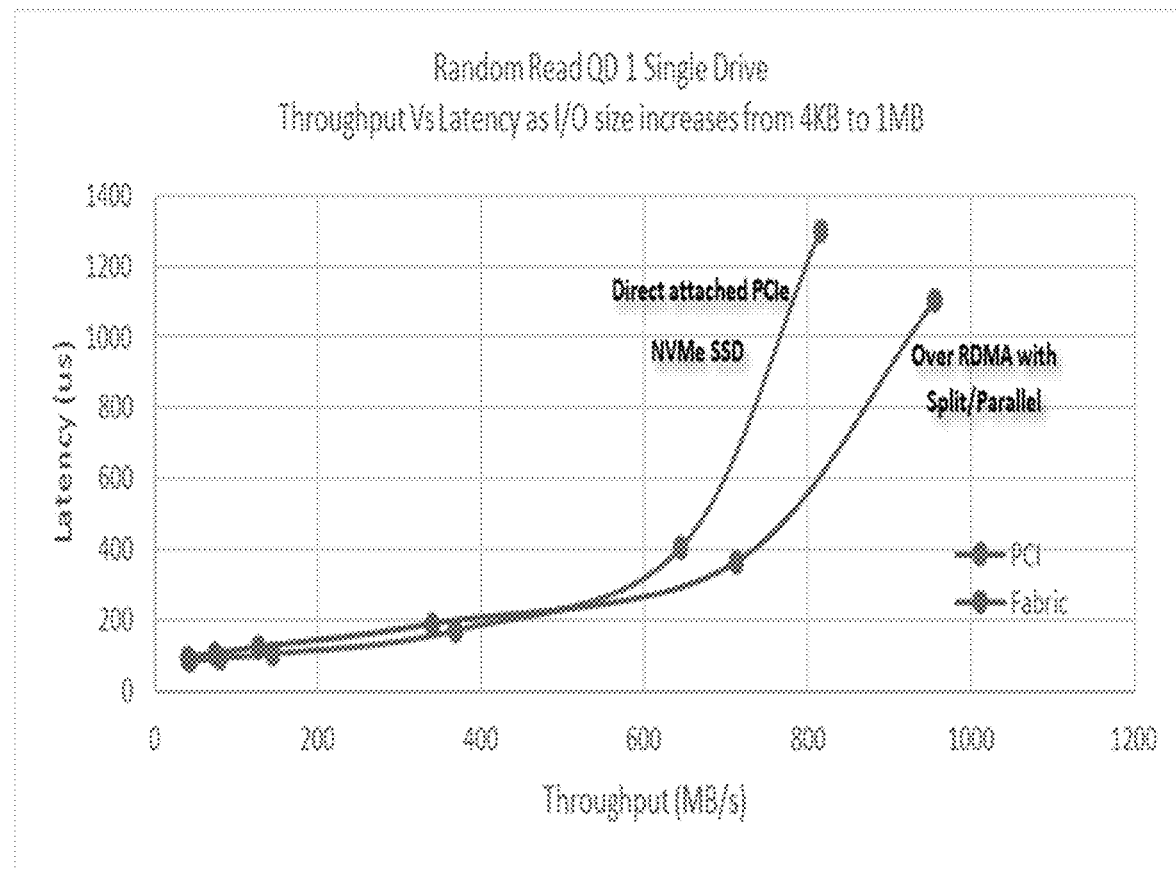
FIG. 1J shows performance results from using the innovative technology of the present disclosure.
Figure 1K:
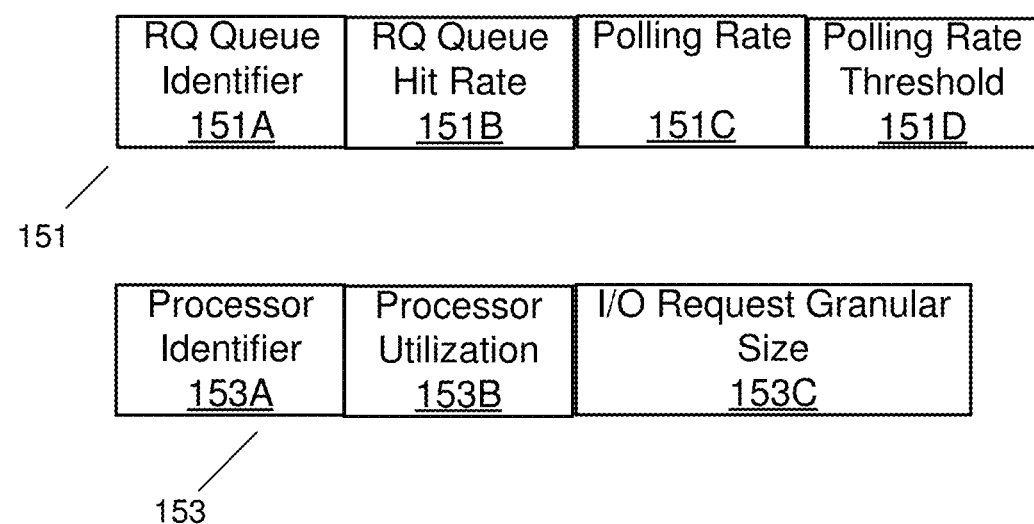
FIG. 1K provides data structure examples used by the innovative technology of the present disclosure.

FIG. 1J shows an example for read impact of NVMe split-parallel transactions over RDMA fabrics compared to a locally attached PCIe NVMe SSD. FIG. 1J shows the progression in performance gain with an increase in I/O size. The latency improvement for larger I/O size is significant (~50% gain) with much improved latency knee.

In one aspect, methods and systems for processing I/O requests in a networked storage environment are disclosed. One method included polling (e.g., B139, FIG. 1I), by a processor (e.g., a processor of the target bridge 120), a receive queue (e.g., 148A) at a first polling rate (e.g., 151C) to identify I/O requests received by the receive queue to read data from or write data to a storage device (e.g. 118A-118N); determining (e.g., B141, FIG. 1I), by the processor that a hit rate (e.g., 151B) has reached a threshold value (e.g., 151D), the hit rate indicating a number of pending I/O requests at the receive queue, in response to the receive queue being polled at the first polling rate; and modifying (e.g., B143, FIG. 1I), by the processor, the first polling rate to a second polling rate, in response to the hit rate reaching the threshold value. The second polling rate is greater than the first polling rate, in response to the threshold value indicating that there are more than a certain number of I/O requests at the receive queue. In another aspect, the second polling rate is less than the first polling rate, in response to the threshold value indicating a lower number of I/O requests at the receive queue, when polled at the first polling rate.

In another aspect, the method includes: receiving (e.g., 103, FIG. 1G), by the processor, an I/O request to write data to the storage device; splitting (e.g., 107, FIG. 1G), by the processor, the I/O request into a plurality of write requests directed to a storage controller managing the storage device; simultaneously issuing (e.g., 109) by the processor, remote direct memory access ("RDMA") read requests to a computing system for obtaining data for the I/O request; indicating (e.g., 115, FIG. 1G) by the processor, completion of the I/O request, upon receiving an indication from the storage controller that each of the plurality of write requests is complete.

In another aspect, the method includes splitting (e.g., 117, FIG. 1G), by the processor, an I/O request to read data from the storage device into a plurality of read requests directed to a storage controller managing the storage device; simultaneously issuing (e.g., 123, FIG. 1G), by the processor, remote direct memory access ("RDMA") write requests to a computing system for sending data requested by the I/O request to the computing system; receiving (e.g., 121, FIG. 1G), by the processor, data associated with the plurality of read requests using a plurality of direct memory access operations; and indicating (e.g., 127, FIG. 1G), by the processor, completion of the I/O request, upon receiving an indication from the storage controller that each of the plurality of read requests is complete and data is transmitted to the computing system via the RDMA write requests.

In one aspect, the number of the plurality of write and/or read requests vary based on processor workload and the hit rate (e.g., B129, FIG. 1H).

In one aspect, innovative technology for processing a write request by an innovative method is provided. The method including determining (e.g., 103, FIG. 1G), by a target system (e.g., 156, FIG. 1E), that a write request (e.g., 160, FIG. 1E) received from a storage server (e.g., 108, FIG. 1E) is a large write request, based on an amount of data (e.g., Write (64K) 160, FIG. 1E) to be written for the write request at a storage device (e.g., 118, FIG. 1D) managed by a storage device controller (e.g., 152, FIG. 1E) interfacing with the target system and the storage device; identifying (e.g., B129, FIG. 1H), by the target system, a granular size (e.g., 153C, FIG. 1K) to split the write request into a plurality of write requests (e.g., 162C, 162G, FIG. 1E), based on a utilization (e.g., 153B, FIG. 1K) of a processor (e.g., 502, FIG. 4) of the target system configured to process input/output (I/O) requests, the granular size indicating a number of the plurality of write requests; generating (e.g., 109, FIG. 1G), by the target system, a plurality of read requests (e.g., 162A, 162E, FIG. 1E) for the storage server, each read request corresponding one of the plurality of write requests; issuing (e.g., 111A, FIG. 1G), by the target system, the plurality of write requests to the storage device controller, in response to receiving data (e.g., 162B, 162F, FIG. 1E) for the plurality of read requests from the storage server; and transmitting (e.g., 115, FIG. 1G), by the target system, a completion notification (e.g., 164, FIG. 1E) indicating completion of the write request to the storage server, in response to the storage device controller writing data for each of the plurality of write requests.

In one another aspect, innovative technology for processing a read request by an innovative method is provided. The method includes determining (e.g., 103, FIG. 1G), by a target system, that a read request (e.g., 168, FIG. 1F) received from a storage server (e.g., 108, FIG. 1F) is a large read request, based on an amount of data (e.g., Read (64K) 168, FIG. 1F) to be read for the read request from a storage device (e.g., 118, FIG. 1D) managed by a storage device controller (e.g., 152, FIG. 1F) interfacing with the target system and the storage device; identifying (e.g., B129, FIG. 1H), by the target system, a granular size (e.g., 153C, FIG. 1K) to split the read request into a plurality of read requests (e.g., 170A, 170E, FIG. 1E), based on a utilization (e.g., 153B, FIG. 1K) of a processor (e.g., 502, FIG. 4) of the target system configured to process input/output (I/O) requests, the granular size indicating a number of the plurality of read requests; issuing (e.g., 119, FIG. 1G), by the target system, the plurality of read requests to the storage device controller to read data for the plurality of read requests from the storage device; generating (e.g., 123, FIG. 1G), by the target system, a plurality of write requests (e.g., 170D, 170G, FIG. 1F) to the storage server, each write request corresponding one of the plurality of read requests; transferring (e.g., 123, FIG. 1G), by the target system, data to the storage server for each of the plurality write requests, upon completion of each read request by the storage device controller; and transmitting (e.g., 127, FIG. 1G), by the target system, a completion notification (e.g., 174, FIG. 1F) indicating completion of the read request to the storage server, in response to transmitting data for a last read request of the plurality of read requests.

Clustered Storage System: FIG. 2A shows a cluster-based storage environment 200 having a plurality of storage system nodes 208.1-208.3 (may also be referred to as storage system node 108 or storage system nodes 108) operating to store data on behalf of clients at storage subsystem 112. Each storage system node includes the storage system 108, the target bridge 120 and the NVMe storage subsystem 112 described above in detail. Storage environment 200 may include a plurality of client systems 204.1-204.N (may also be referred to as "client system 204" or "client systems 204") as part of or associated with storage tenant 140, a clustered storage system 202 (similar to storage system 108) and at least a network 206 communicably connecting the host system 102A-102N, client systems 204.1-204.N, the management console 132, the storage (or cloud) provider 124 and the clustered storage system 202. It is noteworthy that these components may interface with each other using more than one network having more than one network device.

The clustered storage system 202 includes a plurality of storage system nodes 208.1-208.3 (also referred to as "node 208" or "nodes 208"), a cluster switching fabric 210, and a plurality of mass storage devices 118.1-118.3 (similar to 118, FIG. 1C). The nodes 208.1-208.3 can be configured as high-availability pair nodes to operate as partner nodes. For example, nodes 208.1 and 208.2 may operate as partner nodes. If node 208.1 fails, node 208.2 takes over the storage volumes that are exposed by node 208.1 during a failover operation.

Each of the plurality of nodes 208.1-208.3 is configured to include a network module, a storage module, and a management module, each of which can be implemented as a processor executable module. The nodes implement portions of the storage system 108, the target bridge 120 to access the storage subsystem 112 via a network connection for RDMA operations described above. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the host systems 102A-102N, and the client systems 204.1-204.N (or the management console 132) over the computer network 206. The network modules 214.1-214.3 handle file network protocol processing (for example, CFS, NFS and/or iSCSI requests). The storage modules 216.1-216.3 connect to one or more of the storage devices 118 and process I/O requests, as described above in detail. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices, such as storage devices 118.1-118.3.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs")), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs 219 and storage associated with one or more SVMs. Client systems can access the data on a SVM from any node of the clustered system, through the VIF(s) 219 associated with that SVM.

Each of the nodes 208.1-208.3 is defined as a computing system to provide services to one or more of the client systems 204.1-204.N and host systems 102A-102N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Storage Operating System: FIG. 2B illustrates a generic example of the storage operating system 134 executed by the storage system node 108 (or nodes 208.1-208.3, FIG. 2A), according to one aspect of the present disclosure. In one example, storage operating system 134 may include several modules, or "layers" executed by one or both of network module 214 and storage module 216. These layers include the file system manager 240 that keeps track of a hierarchical structure of the data stored in storage devices 118 and manages read/write operation, i.e., executes read/write operation on storage in response to I/O requests.

Storage operating system 134 may also include a protocol layer 242 and an associated network access layer 246, to allow node 208.1 to communicate over a network with other systems, such as clients 204.1/204. N. Protocol layer 242 may implement one or more of various higher-level network protocols, such as SAN (e.g., iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between host systems and mass storage devices are illustrated schematically as a path, which illustrates the flow of data through storage operating system 134. In one aspect, a RDMA layer is executed within the network access layer 246 to enable RDMA communication.

The storage operating system 134 may also include a storage access layer 244 and an associated storage driver layer 248 to allow storage module 216 to communicate with a storage device. The storage access layer 244 may implement a higher-level storage protocol, such as RAID (244A), a S3 layer 244B to access a capacity tier for object-based storage (not shown), and other layers 244C.

The storage driver layer 248 may implement a lower-level storage device access protocol, such as NvMe-oF driver 136A/136B described above in detail, Fibre Channel or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a storage system node, implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly attached to a client or host computer. The term "storage system" should therefore be taken broadly to include such arrangements in addition to any subsystems configured to perform a storage function and associated with other equipment or systems, e.g., the storage system 108, the target bridge 120 and the storage subsystem 112, described above in detail. It should be noted that while this description is written in terms of a write anywhere file system, the teachings of the present disclosure may be utilized with any suitable file system, including a write in place file system.

Figure 3:
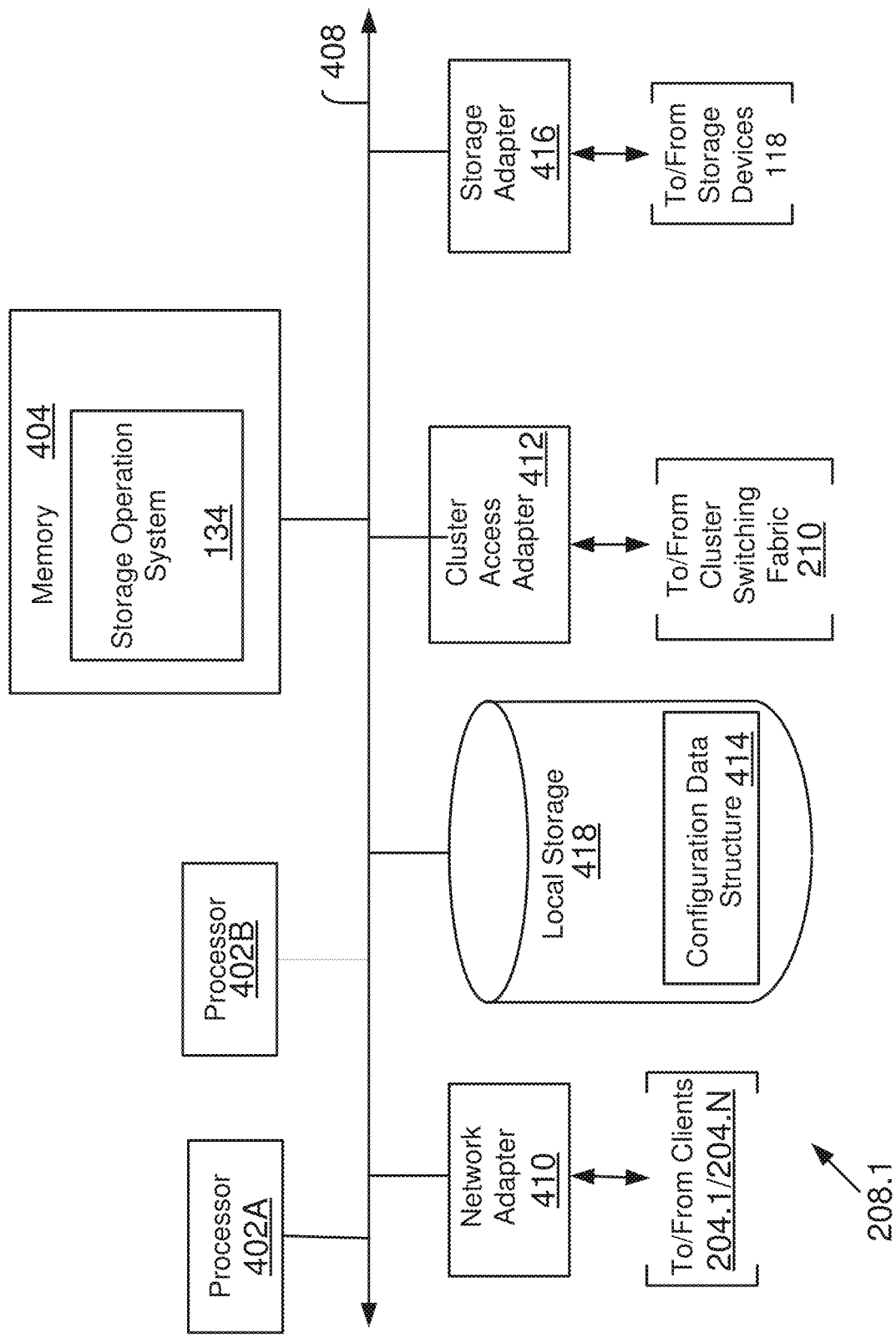
FIG. 3 shows an example of a storage system node, according to various aspects of the present disclosure.

Storage System Node: FIG. 3 is a block diagram of a node 208.1, (including the storage system 108 and the target bridge 120) that is illustratively embodied as a storage system comprising of a plurality of processors 402A and 402B, a memory 404, a network adapter 410, a cluster access adapter 412, a storage adapter 416 and local storage 418 interconnected by a system bus 408.

Processors 402A-402B may be, or may include, one or more programmable general-purpose or special-purpose microprocessors, digital signal processors (DSPs), programmable controllers, application specific integrated circuits (ASIC s), programmable logic devices (PLDs), or the like, or a combination of such hardware devices.

In one aspect, processors 402A/402B utilization, when implemented in the target bridge 120 is monitored and the processor utilization is stored in data structure 153, as described above. The processors 402A/402B also poll the RQ at a certain polling rate, as described above with respect to FIG. 1K.

The local storage 418 comprises one or more storage devices utilized by the node to locally store configuration information for example, in a configuration data structure 414.

The cluster access adapter 412 comprises a plurality of ports adapted to couple node 208.1 to other nodes of cluster 202 (FIG. 2A). In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 412 is utilized by the network/storage module for communicating with other network/storage-modules in the cluster 202.

Each node 208.1 is illustratively embodied as a dual processor storage system executing the storage operating system 134 that preferably implements a high-level module, such as a file system 240, to logically organize the information as a hierarchical structure of named directories and files at storage 118. However, it will be apparent to those of ordinary skill in the art that the node 208.1 may alternatively comprise a single or more than two processor systems. Illustratively, one processor 402A executes the functions of the network module on the node, while the other processor 402B executes the functions of the storage module.

The memory 404 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node. In one aspect, data that needs to be written is first stored at a buffer cache in memory 404. The written data is then stored persistently at storage devices 118 during a consistency point operation.

The network adapter 410 comprises a plurality of ports adapted to couple the node 208.1 to one or more clients 204.1/204.N over point-to-point links, wide area networks, virtual private networks implemented over a public network (Internet) or a shared local area network. The network adapter 410 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

Figure 4:
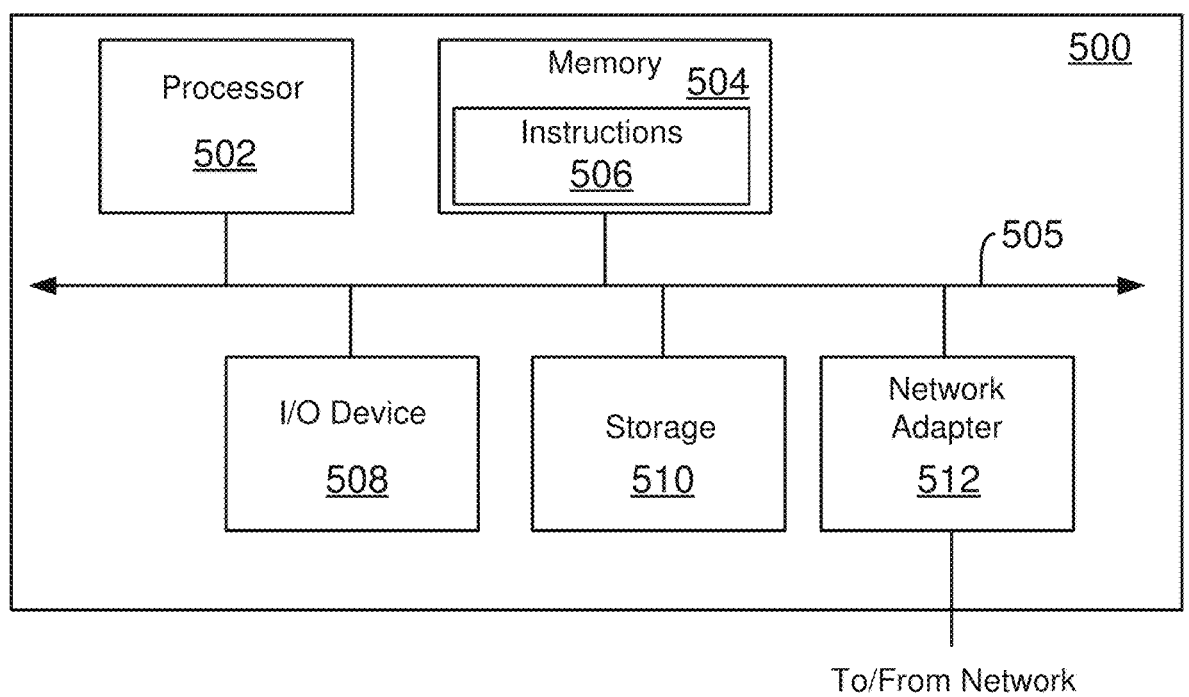
FIG. 4 shows an example of a processing system, used according to various aspects of the present disclosure.

The storage adapter 416 cooperates with the storage operating system 134 executing on the node 208.1 to access information requested by the clients. The information may be stored on any type of attached array of writable storage device media such as hard drives, solid state drives, storage class memory, video tape, optical, DVD, magnetic tape, bubble memory, electronic random-access memory, micro-electromechanical and any other storage media adapted to store information, including data and parity information. However, as illustratively described herein, the information is preferably stored at storage device 118.1. The storage adapter 416 comprises a plurality of ports having input/output (I/O) interface circuitry that couples to the storage devices over an I/O interconnect arrangement. In one aspect, the storage adapter 416 is or includes the RDMA NIC 138A/138B, described above in detail, Processing System: FIG. 4 is a high-level block diagram showing an example of the architecture of a processing system 500 that may be used according to one aspect. The processing system 500 can represent storage system node 108, target bridge 120, host system 102, management console 132, or clients 116, 204. Note that certain standard and well-known components which are not germane to the present aspects are not shown in FIG. 4.

The processing system 500 includes one or more processor(s) 502 and memory 504, coupled to a bus system 505. The bus system 505 shown in FIG. 4 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. The processors 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to implement the process steps of FIGS. 1E-1I and store data structures 151/153, may reside in and executed (by processors 502) from memory 504.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, solid state drives, or any other storage media. The network adapter 512 provides the processing system 500 with the ability to communicate with remote devices (e.g., storage servers) over a network and may be, for example, an RDMA adapter or NIC (138A/138B), Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the storage system 108 is accessible as a cloud service. Details regarding these layers are not germane to the embodiments disclosed herein.

Thus, methods and systems for efficiently processing I/O requests have been described. Note that references throughout this specification to "one aspect" (or "embodiment") or "an aspect" mean that a particular feature, structure, or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   determining, by a target system, that a write request received from a storage server is a large write request, based on an amount of data to be written for the write request at a storage device managed by a storage device controller interfacing with the target system and the storage device;
   identifying, by the target system, a granular size to split the write request into a plurality of write requests, based on a utilization of a processor of the target system configured to process input/output (I/O) requests, the granular size indicating a number of the plurality of write requests;
   generating, by the target system, a plurality of read requests for the storage server, each read request corresponding one of the plurality of write requests;
   issuing, by the target system, the plurality of write requests to the storage device controller, in response to receiving data for the plurality of read requests from the storage server; and
   transmitting, by the target system, a completion notification indicating completion of the write request to the storage server, in response to the storage device controller writing data for each of the plurality of write requests.

2. The method of claim 1, further comprising:
   storing, by the target system, data received from the storage server for each of the plurality of read requests in a target system memory; and
   transferring, by the storage device controller, data from the target system memory to the storage device using one or more direct memory access (DMA) operations.

3. The method of claim 2, further comprising:
   transmitting, by the target system, the completion notification to the storage server upon the storage device controller completing a last DMA operation for transferring data associated with a last write request of the plurality of requests to the target system memory.

4. The method of claim 1, wherein the plurality of write requests are remote direct memory access (RDMA) write requests.

5. The method of claim 1, wherein the plurality of read requests are remote direct memory access (RDMA) read requests.

6. The method of claim 1, further comprising:
   monitoring, by the target system, the utilization for dynamically determining the granular size for splitting the write request into the plurality of write requests.

7. The method of claim 1, further comprising:
   interfacing, by the target system, with the storage server via a network connection for enabling the storage server access to the storage device via the target system.

8. A method, comprising:
   determining, by a target system, that a read request received from a storage server is a large read request, based on an amount of data to be read for the read request from a storage device managed by a storage device controller interfacing with the target system and the storage device;
   identifying, by the target system, a granular size to split the read request into a plurality of read requests, based on utilization of a processor of the target system configured to process input/output (I/O) requests, the granular size indicating a number of the plurality of read requests;
   issuing, by the target system, the plurality of read requests to the storage device controller to read data for the plurality of read requests from the storage device;
   generating, by the target system, a plurality of write requests for the storage server, each write request corresponding one of the plurality of read requests;
   transferring, by the target system, data to the storage server for each of the plurality write requests, upon completion of each read request by the storage device controller; and
   transmitting, by the target system, a completion notification indicating completion of the read request to the storage server, in response to transmitting data for a last read request of the plurality of read requests.

9. The method of claim 8, further comprising:
   transferring, by the storage device controller, data for each of the plurality of read requests from the storage device to a target system memory using one or more direct memory access (DMA) operations.

10. The method of claim 9, further comprising:
    transmitting, by the target system, the completion notification, upon the storage device controller completing a last DMA operation transferring data associated with a last read request of the plurality of read requests to the target system memory.

11. The method of claim 8, wherein the plurality of write requests are remote direct memory access (RDMA) write requests.

12. The method of claim 8, wherein the plurality of read requests are remote direct memory access (RDMA) read requests.

13. The method of claim 8, further comprising:
monitoring, by the target system, the utilization for dynamically determining the granular size for splitting the read request into the plurality of read requests.

14. The method of claim 8, further comprising:
interfacing, by the target system, with the storage server via a network connection for enabling the storage server access to the storage device via the target system.

15. A non-transitory, machine readable storage medium having stored thereon instructions comprising machine executable code, which when executed by a machine, causes the machine to:
determine, by a target system, that a write request received from a storage server is a large write request, based on an amount of data to be written for the write request at a storage device managed by a storage device controller interfacing with the target system and the storage device;
identify, by the target system, a granular size to split the write request into a plurality of write requests, based on a utilization of a processor of the target system configured to process input/output (I/O) requests, the granular size indicating a number of the plurality of write requests;
generate, by the target system, a plurality of read requests to the storage server, each read request corresponding one of the plurality of write requests;
issue, by the target system, the plurality of write requests to the storage device controller, in response to receiving data for the plurality of read requests from the storage server; and
transmit, by the target system, a completion notification indicating completion of the write request to the storage server, in response to the storage device controller writing data for each of the plurality of write requests.

16. The non-transitory, machine readable storage medium of claim 15, wherein the machine executable code further causes the machine to:
store, by the target system, data received from the storage server for each of the plurality of read requests in a target system memory; and
transfer, by the storage device controller, data from the target system memory to the storage device using one or more direct memory access (DMA) operations.

17. The non-transitory, machine readable storage medium of claim 16, wherein the machine executable code further causes the machine to:
transmit, by the target system, the completion notification to the storage server, upon the storage device controller completing a last DMA operation for transferring data associated with a last write request of the plurality of requests to the target system memory.

18. The non-transitory, machine readable storage medium of claim 15, wherein the plurality of write requests are remote direct memory access (RDMA) write requests.

19. The non-transitory, machine readable storage medium of claim 15, wherein the plurality of read requests are remote direct memory access (RDMA) read requests.

20. The non-transitory, machine readable storage medium of claim 15, wherein the machine executable code further causes the machine to:
monitor, by the target system, processor utilization for dynamically determining the granular size for splitting the write request into the plurality of write requests.

* * * * *